United States Patent [19]

Shirota et al.

[11] Patent Number: 5,726,724
[45] Date of Patent: Mar. 10, 1998

[54] METHOD FOR MANUFACTURING A COLOR FILTER USING AN INK JET SYSTEM TO COLOR PORTIONS WHICH HAVE AREAS FROM 1.2 TO 1.5 TIMES GREATER THAN THE LIGHT TRANSMITTABLE PORTIONS

[75] Inventors: Katsuhiro Shirota, Inagi; Hiroshi Sato; Hideto Yokoi, both of Yokohama; Takeshi Miyazaki, Ebina; Akio Kashiwazaki, Yokohama; Shoji Shiba, Sagamihara, all of Japan

[73] Assignee: Canon Kabushiki Kaisha, Tokyo, Japan

[21] Appl. No.: 345,703

[22] Filed: Nov. 21, 1994

[30] Foreign Application Priority Data

Nov. 24, 1993 [JP] Japan ................. 5-293396

[51] Int. Cl.$^6$ ............... G02F 1/1335; G02B 5/22; G03F 9/00
[52] U.S. Cl. ............... 349/106; 359/891; 430/7
[58] Field of Search ............... 359/67, 68, 891; 427/165, 510, 511, 512; 430/7, 20; 349/106

[56] References Cited

U.S. PATENT DOCUMENTS

| | | | |
|---|---|---|---|
| 4,236,098 | 11/1980 | Horak et al. | 359/891 |
| 4,313,124 | 1/1982 | Hara | 346/140 R |
| 4,345,262 | 8/1982 | Shirato et al. | 346/140 R |
| 4,418,284 | 11/1983 | Ogawa et al. | 250/578 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,580,159 | 4/1986 | Manabe | 359/891 |
| 4,608,577 | 8/1986 | Hori | 346/140 R |
| 4,698,113 | 10/1987 | Ogawa | 156/275.7 |
| 4,723,129 | 2/1988 | Endo et al. | 346/1.1 |
| 4,740,796 | 4/1988 | Endo et al. | 346/1.1 |
| 4,818,075 | 4/1989 | Takao et al. | 350/339 F |
| 4,846,556 | 7/1989 | Haneda | 350/317 |
| 4,864,324 | 9/1989 | Shirota et al. | 346/1.1 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,011,623 | 4/1991 | Yoshinaga et al. | 252/229.5 |
| 5,039,208 | 8/1991 | Ohnishi et al. | 359/100 |
| 5,079,214 | 1/1992 | Long et al. | 503/227 |
| 5,190,794 | 3/1993 | Yoshino et al. | 427/162 |
| 5,278,009 | 1/1994 | Iida et al. | 430/7 |
| 5,281,450 | 1/1994 | Yaniv | 427/165 |
| 5,317,434 | 5/1994 | Ohara | 359/68 |
| 5,340,619 | 8/1994 | Chen et al. | 427/165 |
| 5,358,558 | 10/1994 | Yamamoto et al. | 106/22 R |
| 5,418,094 | 5/1995 | Sato et al. | 430/7 |
| 5,420,708 | 5/1995 | Yokoyama et al. | 359/67 |

FOREIGN PATENT DOCUMENTS

| | | |
|---|---|---|
| 0400738 | 12/1990 | European Pat. Off. . |
| 0552035 | 7/1993 | European Pat. Off. . |
| 54-056847 | 5/1979 | Japan . |
| 01235903 | 9/1982 | Japan . |
| 59-075205 | 4/1984 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-235901 | 9/1988 | Japan . |
| 63-294503 | 12/1988 | Japan . |
| 01217302 | 8/1989 | Japan . |
| 01217320 | 8/1989 | Japan . |
| 02228605 | 9/1990 | Japan . |

(List continued on next page.)

Primary Examiner—William L. Sikes
Assistant Examiner—Walter Malinowski
Attorney, Agent, or Firm—Fitzpatrick, Cella, Harper & Scinto

[57] ABSTRACT

A color filter having shade portions and colored light-transmittable portions on a substrate, said color filter being characterized in that the light-transmittable portions are colored with ink dots, and a difference between a maximum value and a minimum value of light transmittance in a thickness direction in the light-transmittable portions is 20% or less.

8 Claims, 8 Drawing Sheets

FOREIGN PATENT DOCUMENTS

| | | |
|---|---|---|
| 3-10220 | 1/1991 | Japan . |
| 04123005 | 4/1992 | Japan . |
| 04317007 | 11/1992 | Japan . |
| 4-349401 | 12/1992 | Japan ..................................... 359/68 |
| 05173010 | 7/1993 | Japan . |
| 5241012 | 9/1993 | Japan . |
| 05288913 | 11/1993 | Japan . |
| 93 24240 | 12/1993 | WIPO . |

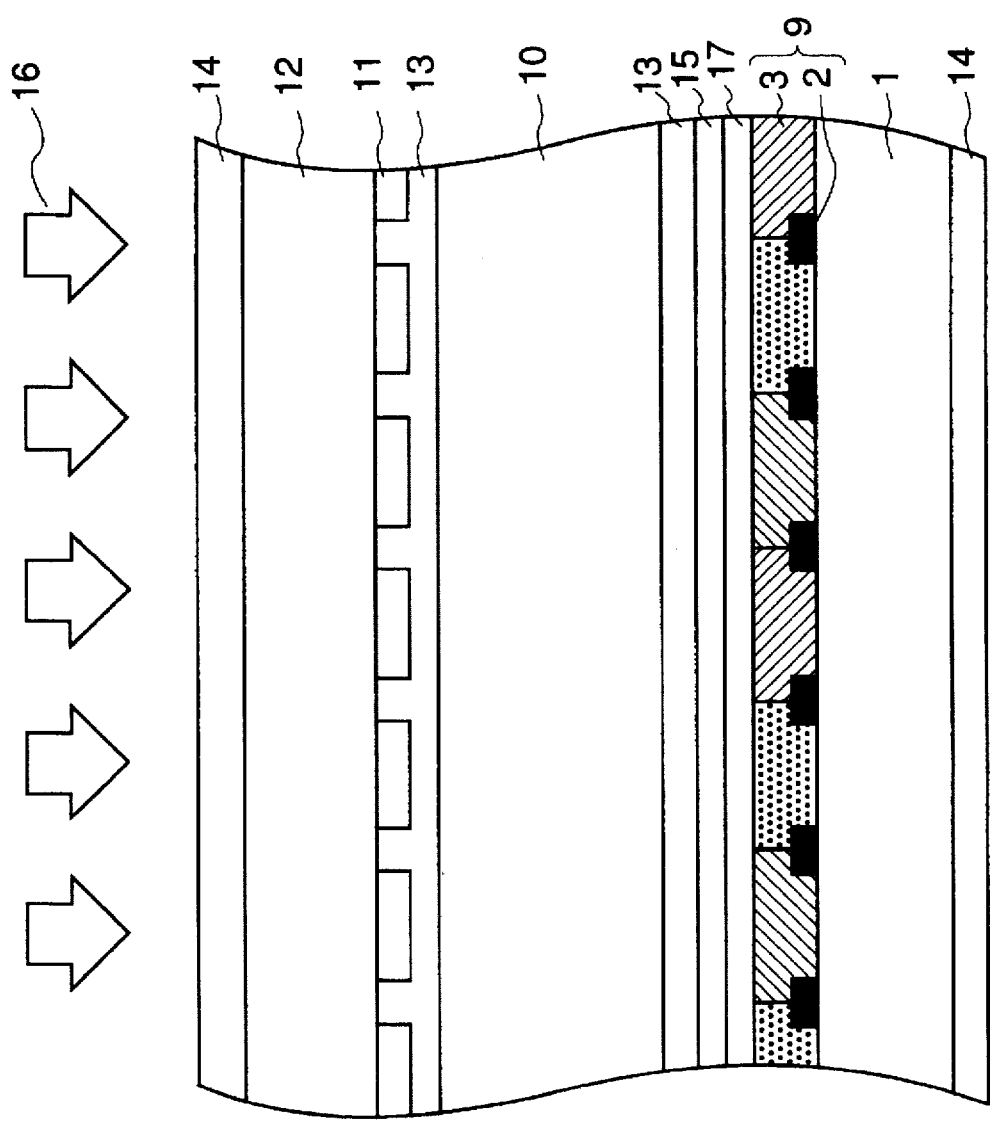

METHOD FOR MANUFACTURING A COLOR FILTER USING AN INK JET SYSTEM TO COLOR PORTIONS WHICH HAVE AREAS FROM 1.2 TO 1.5 TIMES GREATER THAN THE LIGHT TRANSMITTABLE PORTIONS

BACKGROUND OF THE INVENTION

1. Field of the Invention

The present invention relates to a color filter suitable for a color liquid crystal display which can be used in a color television, a personal computer, a "PACHINKO" game machine (a kind of ball-game machines) and the like, and a method for manufacturing the color filter. More specifically, it relates to a color filter for liquid crystals manufactured by the utilization of an ink jet recording technique, and a method for manufacturing the color filter.

In addition, the present invention also relates to a liquid crystal panel equipped with the above-mentioned color filter.

2. Related Background Art

In recent years, there has been a tendency that the demand of liquid crystal displays, particularly color liquid crystal displays increases with the development of personal computers, particularly portable personal computers. However, for the further spread of the displays, it is necessary to lower their costs, and particularly with regard to the color filter which largely occupies the cost of each display, request for its cost reduction increases.

In order to meet the required characteristics of the color filter and to satisfy the above-mentioned demand, various attempts have been heretofore made, but any method which can meet all of the required characteristics has not been established so far.

Some methods for manufacturing the color filter will be described below.

A first method which has most often been used is a dyeing method. This dyeing method comprises adding a sensitizing material to an aqueous polymer material which is a material to be dyed to sensitize the polymer material, patterning the sensitized material on a glass substrate by a photolithography process, and then immersing the thus obtained pattern in a dyeing bath to obtain a dyed pattern. This operation is repeated three times to form the dyed layers of red(R), green(G) and blue(B).

A second method which has next most often been used is a pigment dispersion method, which is now being replaced with the above-mentioned dyeing method. This pigment dispersion method comprises first forming, on a substrate, a photosensitive resin layer in which a pigment is dispersed, and then patterning the resin layer to obtain a single-colored pattern. Next, this process is repeated three times to form colored layers having three colors of R, G and B.

A third method is an electrodeposition method. This method comprises first patterning transparent electrodes on a substrate, and then immersing it in an electrodeposition coating solution containing a pigment, a resin, an electrolyte and the like to electrodeposit a first color. This process is repeated three times to form colored layers of R, G and B, and in the last step, these layers are calcined.

As a fourth method, a printing method is present which comprises repeatedly printing with a coating material obtained by dispersing a pigment in a thermosetting resin to coat with the three colors of R, G and B, and then heating and setting the colored resin layers to form colored layers. In each of these methods, a protective layer is usually formed on the colored layers.

A point which is common to these methods is that a similar process is repeated three times to form the layers of R, G and B, which naturally increases the cost. In addition, these methods having many steps lead to decrease of a yield.

Moreover, in the third electrodeposition method, the formable patterns are limited, and so it is difficult to apply this method to TFT color by an existent technique. The fourth method has a drawback that resolution properties and smoothing properties are poor, and so it is not suitable for the formation of a pattern having a fine pitch.

In order to overcome these drawbacks, techniques for manufacturing a color filter by the use of an ink jet system have been developed, and these techniques have been described in Japanese Patent Application Laid-open Nos. 59-75205, 63-235901, 1-217302 and 4-123005.

These techniques are different from the above-mentioned conventional methods, and they comprise ejecting a coloring solution (hereinafter referred to as "ink") containing coloring matters of R, G and B against a filter substrate through a nozzle, and then drying the ink on the filter to form a colored layer. According to these techniques, the formation of the colored layers of R, G and B can be carried out at once, and the coloring solution can be used without any waste. In consequence, effects such as the remarkable improvement of productivity and the reduction in costs can be obtained.

In these techniques, picture elements are formed by ejecting the droplets of the liquid ink, and so a used ink solvent is required to be sufficiently dried. However, an unevenness of an optical density takes place in one light-transmittable portion, and as a result, there is a serious problem that an obtained image becomes unclear. Thus, a solution to the problem is promptly desired.

SUMMARY OF THE INVENTION

Under such circumstances, an object of the present invention is to provide a method for manufacturing a color filter by an ink jet method, and according to the present invention, sharp colored light-transmittable portions can be obtained in which any unevenness of an optical density is remarkably reduced at different positions in one light-transmittable portion.

Another object of the present invention is to provide a method for manufacturing a color filter at a low cost in which necessary characteristics such as heat resistance, solvent resistance and resolution properties which a conventional method has are kept up, an ink jet suitability is also satisfied, and a process is shortened.

Another object of the present invention is to provide a highly reliable color filter manufactured by the above-mentioned method.

Still another object of the present invention is to provide a liquid crystal panel equipped with the above-mentioned color filter.

The aforesaid objects can be achieved by the following means.

A first aspect of the present invention is directed to a color filter provided with shade portions and colored light-transmittable portions on a substrate, said color filter being characterized in that the light-transmittable portions are colored with ink dots, and a difference between a maximum value and a minimum value of light transmittance in a thickness direction in the light-transmittable portions is 20% or less.

A second aspect of the present invention is directed to a color filter having shade portions and a plurality of colored light-transmittable portions on a substrate, said color filter being characterized in that the light-transmittable portions are colored with ink dots, the colored portions spread to peripheries of the light-transmittable portions, and the area of the colored portions is 1.2 times or more, preferably 1.4 times or more as much as that of the light-transmittable portions.

A third aspect of the present invention is directed to a method for manufacturing a color filter which comprises ejecting ink droplets through orifices by an ink jet system to apply a coloring agent to the substrate having light-transmittable portions and shade portions, thereby coloring the light-transmittable portions with ink dots, said method being characterized in that the ink droplets are ejected so that colored portions may spread to peripheries of the light-transmittable portions, and the area of the colored portions is 1.2 times or more, preferably 1.4 times or more as much as that of the light-transmittable portions.

A fourth aspect of the present invention is directed to a liquid crystal panel comprising the above-mentioned color filter and a substrate arranged at a position opposite to the color filter, a liquid crystal compound being enclosed between both substrates.

BRIEF DESCRIPTION OF THE DRAWINGS

FIG. 8 shows a sectional structure of a liquid crystal panel.

DETAILED DESCRIPTION OF THE PREFERRED EMBODIMENTS

The present invention will be described in more detail with reference to drawings.

Figure 1:
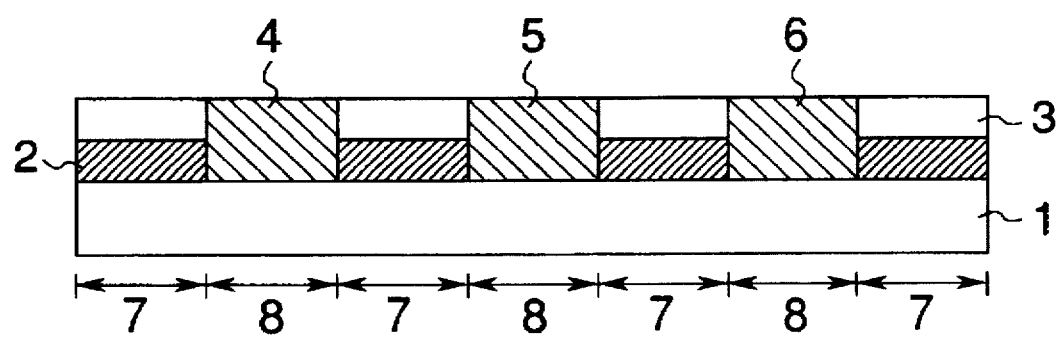
FIG. 1 is a sectional view showing the structure of a color filter.

FIG. 1 is a view for explaining a problem regarding colored portions in a color filter formed with ink dotlets by an ink jet system.

In the color filter, an ink-receiving layer 3 is formed on a light-transmittable substrate 1 having black matrices 2 thereon, and on the ink-receiving layer 3 under which the black matrices 2 are not formed, colored portions 4 to 6 of R, G and B are formed with ink dotlets, whereby shade portions 7 and the light-transmittable portions 8 are provided, as in a section of the color filter. Needless to say, the ink-receiving layers do not have to be formed, depending upon a kind of ink.

Figure 2:
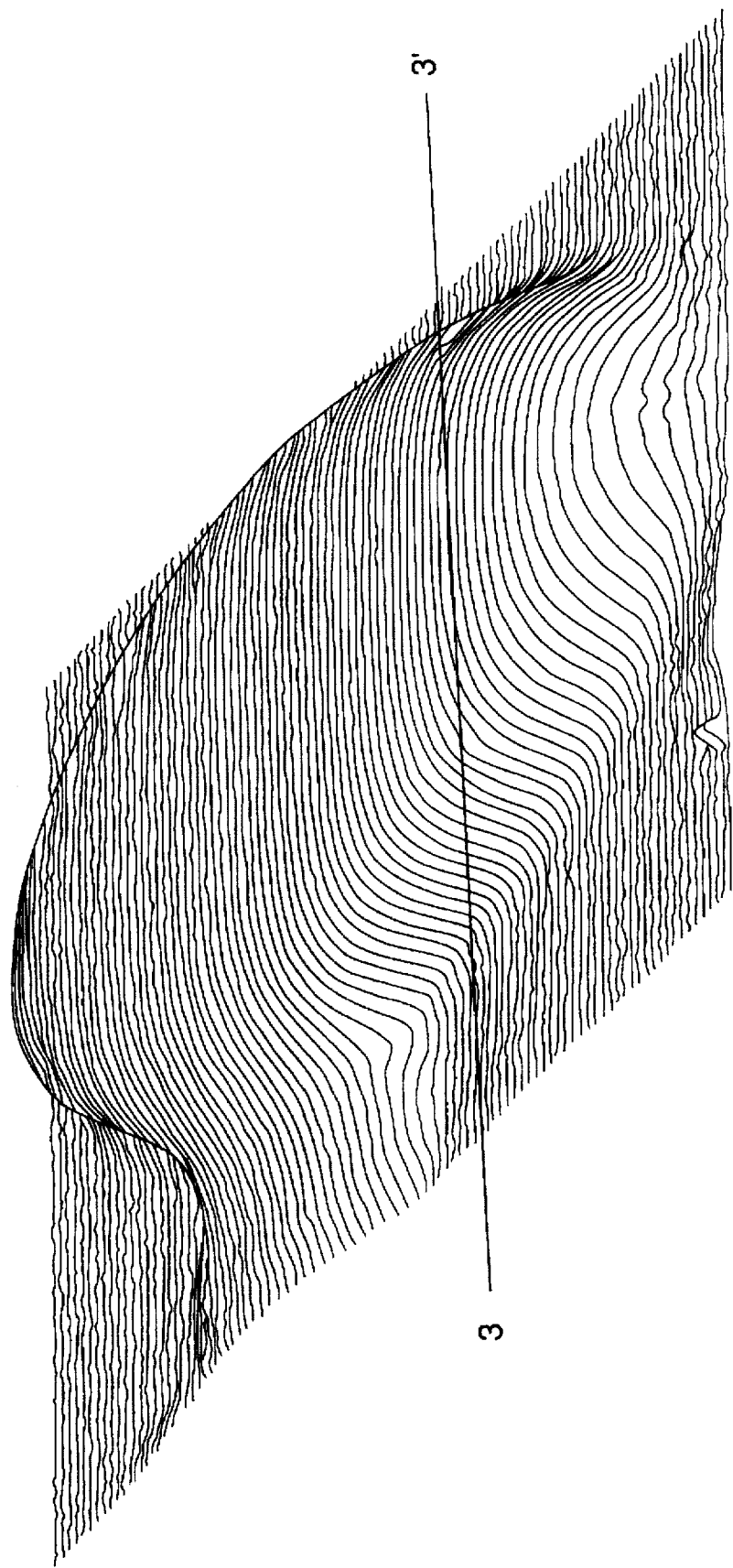
FIG. 2 shows one example of a transmittance distribution in a light-transmittable portion of red color in the color filter.
Figure 3:
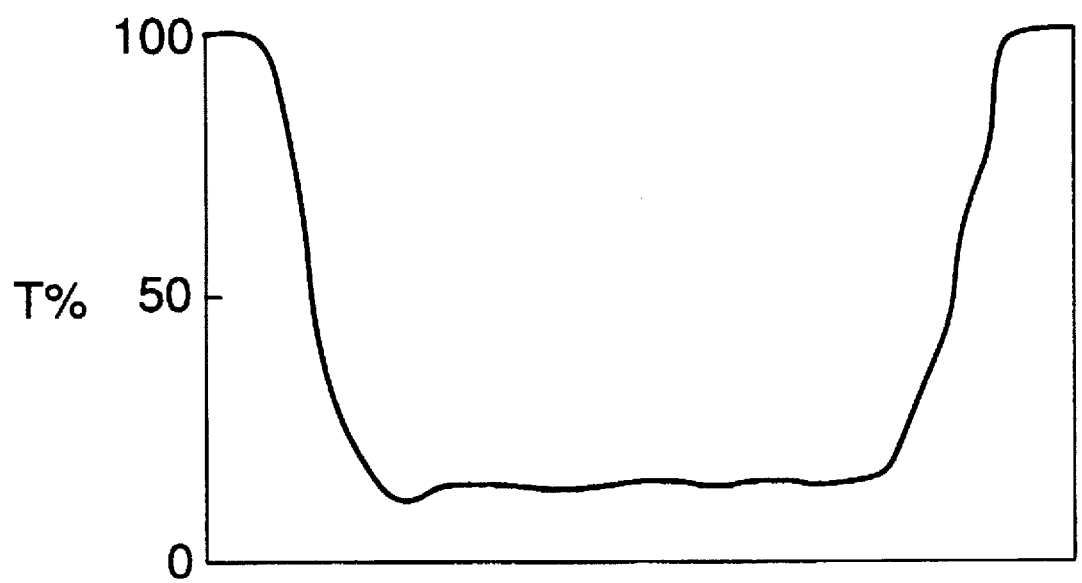
FIG. 3 is a sectional view taken along the line 3–3' in FIG. 2.

FIG. 2 shows optical density distribution (transmittance distribution) in light-transmittable portions of the colored portions 4 of red color in the case that colored portions 4 to 6 are formed only in the light-transmittable portions 8 as shown in FIG. 1. In the measurement of the density distribution, UMSP 80 (a microspectrometer, made by Zweiss Co., Ltd.) is used under measurement conditions of a wavelength of 550 nm, a measurement spot diameter of 0.5 µm, 60 µm to an y direction and 120 µm to a x direction (at a step of 0.5 µm) (the black matrices are omitted). FIG. 3 shows a sectional view taken along the line 3–3' in FIG. 2.

As understood from FIGS. 2 and 3, in the central portion of each light-transmittable portion, values of the transmittance are almost constant, but in the peripheral portion of the light-transmittable portion, the values of the transmittance gradually increase. As a result, a difference in the optical density is present between the central portion and the peripheral portion of the light-transmittable portion, so that the peripheral portion seems to be paler than the central portion. Therefore, even if the opening portion (the light-transmittable portion) of the black matrix which is the shade portion is colored with the ink dots, the so-called blank area (since this area is not covered with the colored layer, the transparent substrate is exposed, with the result that the area whitely shines) appears at a position where the light-transmittable portion comes in contact with the black matrix. That is to say, a phenomenon occurs in which the optical density is lower in the vicinity of the periphery of the light-transmittable portion. As a result, an image obtained through the color filter is poor in contrast and unclear.

Figure 4:
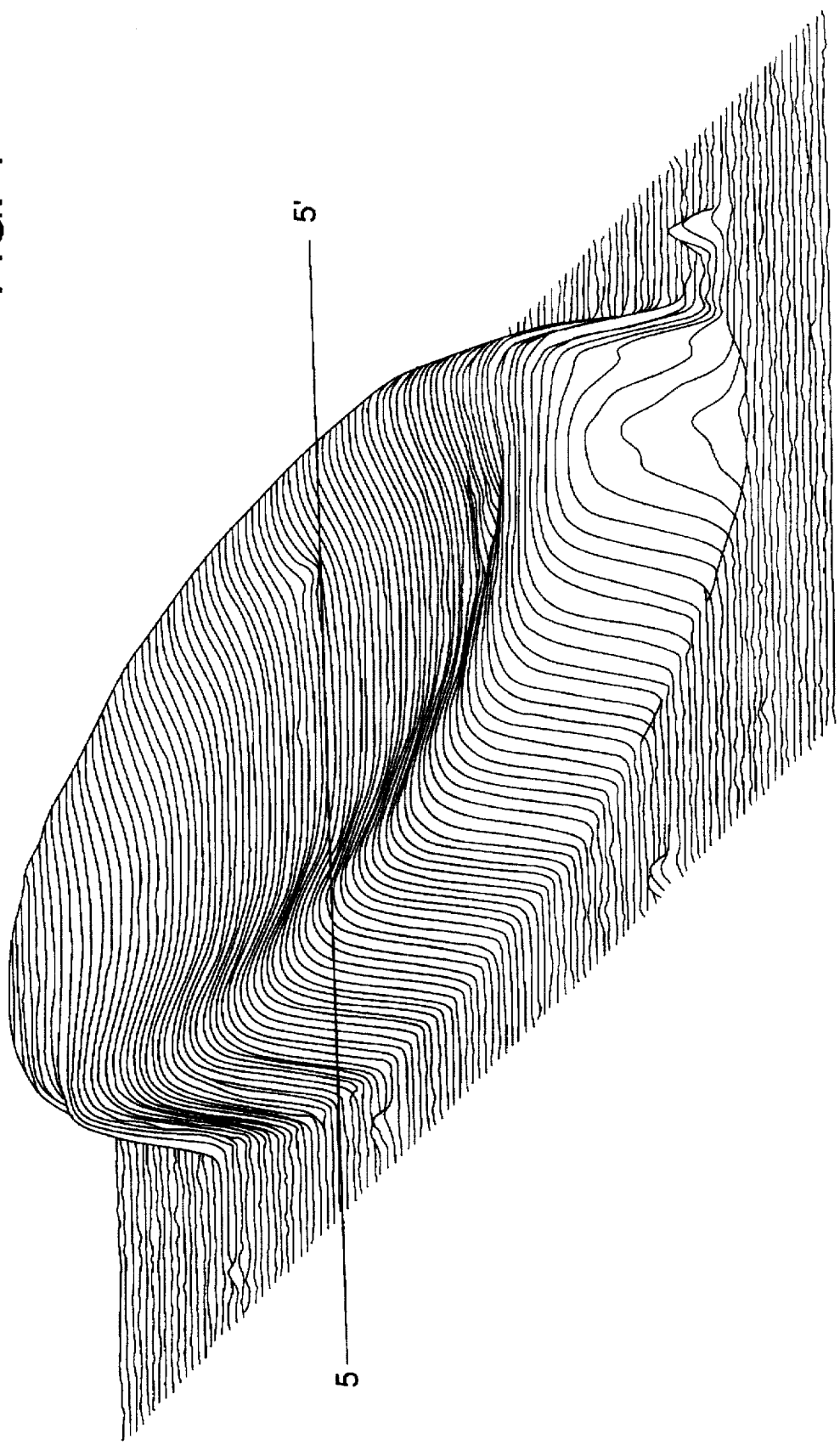
FIG. 4 shows another example of transmittance distribution in a light-transmittable portion of green color in the color filter.
Figure 5:
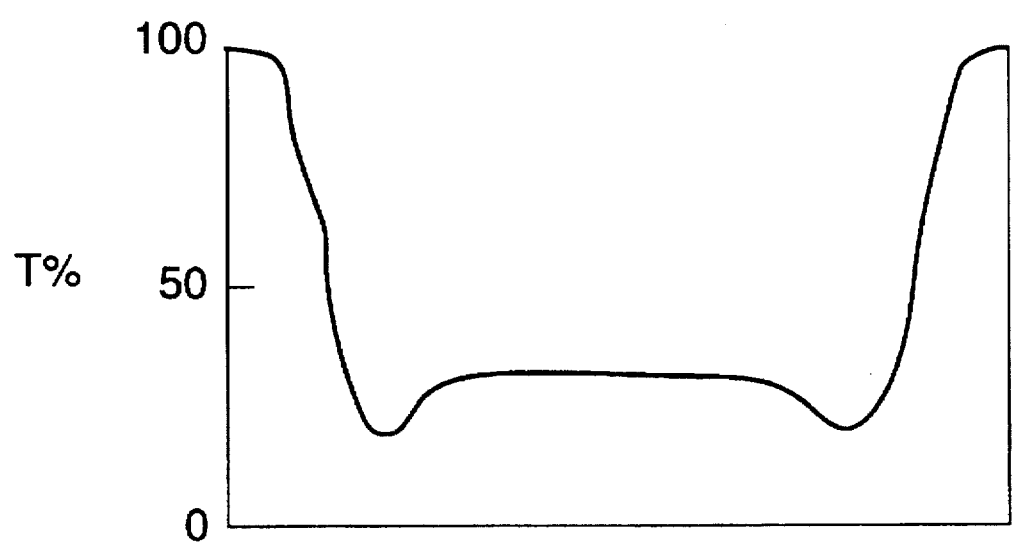
FIG. 5 is a sectional view taken along the line 5–5' in FIG. 4.

FIG. 4 is similar to FIG. 2, and it shows another example of optical density distribution in the light-transmittable portion of a colored portion 5 of green color in the color filter formed with the ink dots by the ink jet system (wavelength is 620 nm and other conditions are the same as in the case of FIG. 2, and the black matrices are omitted). FIG. 5 shows a sectional view taken along the line 5–5' in FIG. 4.

The distribution of the optical density in each light-transmittable portion shown in FIGS. 4 and 5 is different from that of the optical density in FIG. 2, and it shows that the values of the transmittance increase in the central portion of the light-transmittable portion. In this light-transmittable portion, a phenomenon such as the blank area takes place in its central portion, so that the unevenness of the optical density appears in the light-transmittable portion. In consequence, an image obtained through the color filter is poor in contrast and unclear, as in FIGS. 2 and 3.

The phenomena shown in FIGS. 2 to 5 are peculiar phenomena which occur in manufacturing the color filter by the ink jet system using the ink dots, and it can be presumed that they are for the following reason. That is to say, in the case that ink jet recording is carried out, the ink is required to have a relatively low viscosity, and naturally a large amount of a solvent (in the case of an aqueous ink, water is used, and in the case of a non-aqueous ink, a low-viscosity organic solvent is used) is contained in the ink. In a drying (solvent evaporation) step after the ink has been ejected through an ink jet head against a color filter substrate such as glass, the solvent is not uniformly dried sometimes, depending upon various conditions such as a kind of ink solvent, a kind of coloring material, an ambient temperature, a moisture, a substrate temperature, a kind of ink-receiving layer formed on the substrate, and the like. As a result, the coloring material left on the substrate by evaporation to dryness is not uniformly distributed, and thus the unevenness of the optical density appears, as shown in FIGS. 2 to 5. Such a phenomenon does not occur at all in a conventional manufacturing method of the color filter not using the ink jet system, and it comes out only in the color filter formed by the ink jet method.

Figure 6A:
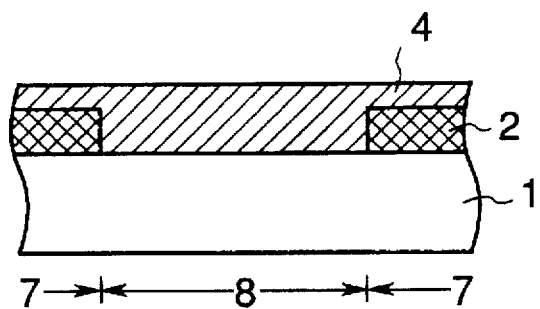
FIGS. 6A and 6B show a sectional view and a plane structure of a colored light-transmittable portion in the color filter.
Figure 6B:
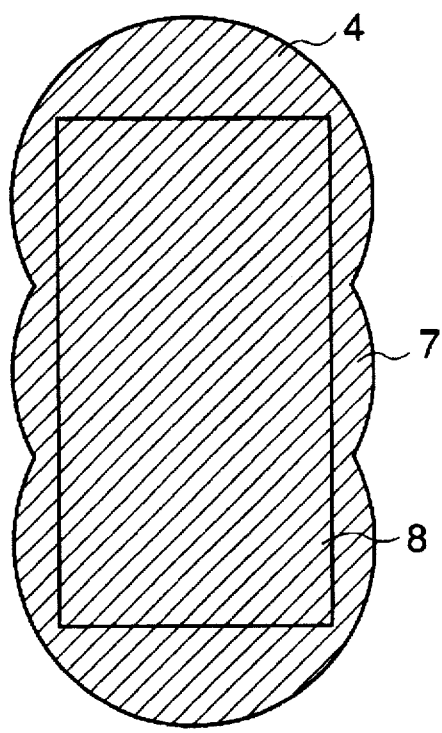

As a result of detailed investigation by the present inventors, it has been found that such an unevenness of the optical density in the light-transmittable portion as shown in FIGS. 2 to 5 can be avoided by forming the colored portion 4 in a range wider than the opening of the black matrix which is the light-transmittable portion 8, as shown in a sectional view of FIG. 6A and a plane view of FIG. 6B.

In short, when the size of the ink dots is regulated in consideration of the opening of the black matrix to decrease the scattering of the values of the transmittance in the light-transmittable portion, the above-mentioned unevenness of the optical density can be inhibited.

Figure 7:
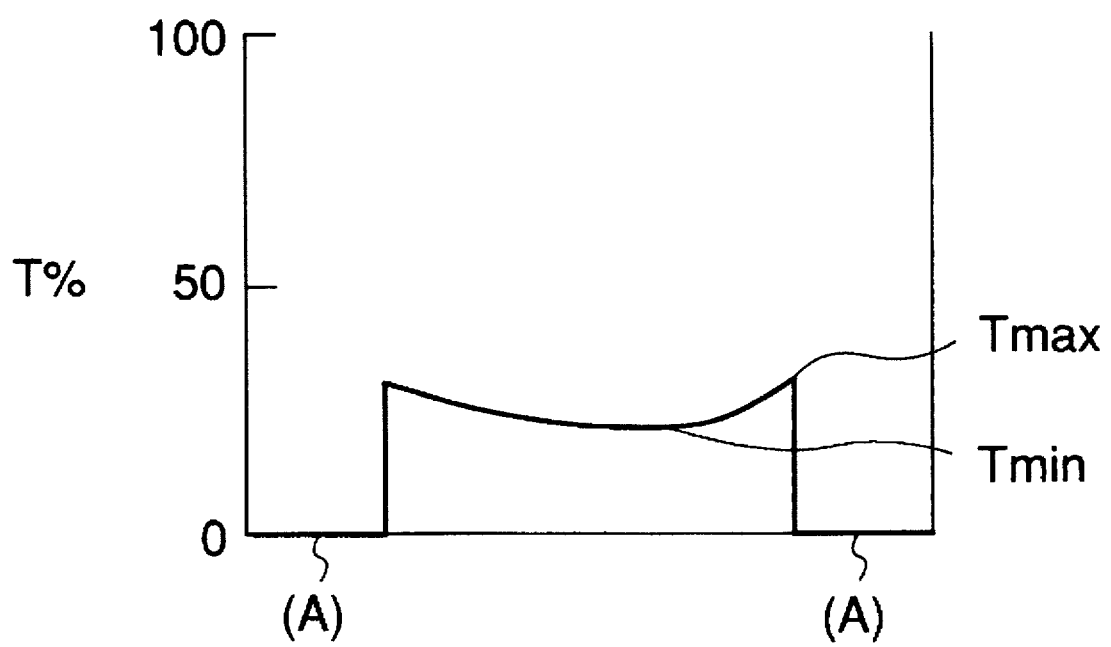
FIG. 7 is a graph for calculating a difference in light transmittance in the light-transmittable portion.

FIG. 7 is a graph for calculating a difference in the light transmittance in a thickness direction in the light-transmittable portion, and in the present invention, $T_{max}-T_{min}$ is the difference in the light transmittance.

The difference between the maximum value and the minimum value of the light transmittance in the one light-transmittable portion can be determined in the following manner. That is to say, all of picture elements are scanned by the use of a device capable of measuring the transmittance of such minute spots as described above, thereby measuring values of the transmittance of the respective portions. Afterward, maximum and minimum values are picked up from the values of the transmittance, and the difference in the transmittance is then obtained by subtracting the minimum value from the maximum value. In this case, as preferable conditions of the measurement, the diameter of a transmittance measuring spot is set to 5 µm or less, and a scan space is set to 3 µm or less. Furthermore, a transmittance measuring wavelength is preferably set to a maximum absorption spectrum (λmax) of the color of the picture elements to be measured. The light transmittance becomes 0% at portions marked with (A) in FIG. 7 where the colored portion is overlapped with a black matrix.

In the present invention, in order to expand the colored portion, the area of the colored portion as shown in FIG. 6B is set so as to be 1.2 times or more, preferably 1.4 times or more as much as that of the light-transmittable portion, whereby preferable results can be obtained.

The expansion of the colored portions can be achieved by regulating wetness (contact angle) on the substrate on which the ink is impacted, or regulating the volume of the ink to be ejected. However, since the inks of R, G and B are not always equal in wetness to each other, and so it is preferable to use the latter method of regulating the volume of the ink to be ejected.

For the purpose of regulating the volume of the ink to be ejected, there can be utilized conventional known methods such as a method of changing the diameter of an orifice through which the ink is ejected, a method of changing the temperature of the ink in a head, a method of changing the viscosity of the ink, and a method of changing the shape of a pulse which is applied to the head.

The area of the light-transmittable portions and that of the shade portions can be measured by the use of a microspectrometer.

In the present invention, the ink may be directly ejected to the substrate having the shade portions and the light-transmittable portions thereon, but light-transmittable ink-receiving layers for accepting the ink may be formed on the shade portions. In addition, a protective layer is preferably formed after the formation of the colored portions. As materials for the ink-acceptable layers and the protective layer, conventional known materials can be used. Examples of the preferable materials for forming the ink-receiving layers include acrylic resins, epoxy resins and imide resins from the viewpoint of heat resistance as well as cellulose derivatives such as hydroxypropyl cellulose, hydoxyethyl cellulose, methyl cellulose and carboxymethyl cellulose from the viewpoint an aqueous ink absorbability. For the formation of the ink-receiving layers and the protective layer, spin coating, roll coating, bar coating, spray coating or dip coating can be used.

As a coloring agent (a coloring material) which can be used to form the colored portions of R, G and B, there can be used various kinds of dyes and pigments which have been used in a conventional ink jet recording method.

In order to form the black matrices in the present invention, some methods can be used. In the case that the black matrices are directly formed on the substrate, there can be used a method which comprises forming a metallic thin film by sputtering or vapor deposition, and then patterning the film by photolithography; or in the case that the black matrices are formed on a resin composition, a usual patterning technique using the photolithography can be used. However, these methods are not restrictive.

FIG. 8 shows a sectional view of a TFT color liquid crystal panel incorporated with the color filter of the present invention.

The color liquid crystal panel can be formed by combining a color filter 9 with a glass substrate 12, and then enclosing a liquid crystal compound 10 therebetween. On the inside of the substrate 12 of the liquid crystal panel, TFT (not shown) and transparent pixel electrodes 11 are formed in the state of matrices. On the inside of glass substrate 1, a color filter 9 is arranged at a position opposite to the pixel electrodes 11, and all over the color filter 9, transparent common electrodes 15 are formed. On the surfaces of both the glass substrates 1 and 12, orientation films 13 are formed and then subjected to a rubbing treatment to arrange liquid crystal molecules in a certain direction. Furthermore, polarizing plates 14 adhere to the outsides of the respective glass substrates 1 and 12, and the liquid crystal compound 10 is filled into the space (about 2 to 5 µm) between these glass substrates. As a back light 16, a combination of fluorescent lamps (not shown) and a scattering plate (not shown) is used, and display is carried out by utilizing a liquid crystal compound as a light shutter for changing the transmittance of the back light. Reference numeral 2 is a black matirx, 3 is an ink receiving layer and 17 is a protective layer.

Now, the present invention will be described in more detail with reference to examples. However, the scope of the present invention should not be limited to these examples. The designation of "%" means "% by weight" unless otherwise noted.

EXAMPLE 1

A glass substrate provided with black matrices having openings of a predetermined size was spin-coated with a resin composition comprising hydroxypropyl cellulose HPC-H (made by Nippon Soda Co., Ltd.) to form an ink-receiving layer, followed by prebaking at 90° C. for 10 minutes. Next, a matrix pattern of colored portions of R, G and B was formed with a pigment-dispersed ink having the following prescription under the regulation of the volume of the ejected ink by the use of an ink jet printer so that the area of the colored portions might be 1.23 times as much as that of light-transmittable portions. In this case, a dot diameter of the R colored portions was 83 µm, dot diameters of the G and B colored portions were each 85 µm, length and width of a black matrix opening were 160 µm and 75 µm, respectively. One colored portion was formed with 3 dots of the respective colors.

At this time, a transmittance distribution of the light-transmittable portions colored with R was measured in the same manner as in FIGS. 3 and 5, and a difference between a maximum value and a minimum value of light transmittance in the one light-transmittable portion colored with R was 8%.

For the G (green) colored portions and the B (blue) colored portions, measurement was similarly made, and differences in the light transmittance were 5% and 10%, respectively.

On the contrary, for comparison, the ink was applied so that the area of the colored portions might be substantially equal to that of the light-transmittable portions by decreasing the amount of the ink to be ejected. In this case, dot diameters of R, G and B were 79 µm, 81 µm and 81 µm, respectively. As a result, differences between maximum values and minimum values of light transmittance in the light-transmittable portions colored with R, G and B were 25%, 32% and 27%, respectively.

Next, baking was carried out at 230° C. for 1 hour, followed by spin coating with a two-pack thermosetting resin material so as to have a film thickness of 1 µm. Afterward, a heat treatment was done at 250° C. for 30 minutes to set the resin material, thereby preparing a color filter for liquid crystals.

Prescription Example of the Ink used in Example 1

|  | Ink R | Ink G | Ink B |
| --- | --- | --- | --- |
| Ethylene glycol | 10% | 10% | 9% |
| Diethylene glycol | 15% | 12% | 16% |
| R, G or B Pigment | 4% | 5% | 3% |
| Styrene-maleic acid resin monoethanolamine salt (average molecular weight = 30,000, acid value = 300) | 0.8% | 1% | 0.6% |
| Water | 70.2% | 72% | 71.4% |
| R (red) pigment: | C.I. Pigment Red 168 | | |
| G (green) pigment: | C.I. Pigment Green 36 | | |
| B (blue) pigment: | C.I. Pigment Blue 60. | | |

EXAMPLE 2

A glass substrate provided with black matrices having openings of a predetermined size was spin-coated with a resin composition comprising hydroxyethyl cellulose AH-15 (made by Fuji Chemical Co., Ltd.) to form an ink-receiving layer, followed by prebaking at 100° C. for 8 minutes. Next, a matrix pattern of colored portions of R, G and B was formed with an ink having the following prescription under the regulation of the volume of the ejected ink by the use of an ink jet printer so that the area of the colored portions might be 1.50 times as much as that of light-transmittable portions. In this case, dot diameters of the R, G and B colored portions were 80 µm, 82 µm and 80 µm, respectively, and length and width of a black matrix opening were 150 µm and 70 µm, respectively. One colored portion was formed with 3 dots of the respective colors.

A difference between a maximum value and a minimum value of light transmittance in the light-transmittable portion colored with R was 16%. For the G (green) colored portions and the B (blue) colored portions, measurement was similarly made, and differences in the light transmittance were 14% and 18%, respectively.

On the contrary, for comparison, the ink was applied so that the area of the colored portions might be substantially equal to that of the light-transmittable portions by decreasing the amount of the ink to be ejected. In this case, dot diameters of R, G and B were all 76 µm. Differences in the light transmittance in the light-transmittable portions colored with R, G and B were 31%, 45% and 29%, respectively.

Next, spin coating was carried out with a two-pack thermosetting resin material so as to have a film thickness of 1 µm, followed by a heat treatment at 180° C. for 30 minutes to set the resin material, thereby preparing a color filter for liquid crystals.

Prescription Example of the Ink used in Example 2

|  | Ink R | Ink G | Ink B |
| --- | --- | --- | --- |
| Diethylene glycol | 20% | 22% | 25% |
| Isopropyl glycol | 3% | 3% | 3% |
| R, G or B Dye | 3% | 3% | 2% |
| Water | 72% | 63% | 66% |
| R (red) dye: | Mixture of C.I. Acid Red 35 and Acid Yellow 23 | | |
| G (green) dye: | Mixture of C.I. Acid Blue 9 and Acid Yellow 23 | | |
| B (blue) dye: | Mixture of C.I. Acid Blue 9 and Acid Red 35. | | |

EXAMPLE 3

A glass substrate provided with black matrices having openings of a predetermined size was spin-coated with a resin composition comprising hydroxyethyl cellulose AH-15 (made by Fuji Chemical Co., Ltd.) to form an ink-receiving layer, followed by prebaking at 100° C. for 10 minutes. Next, a matrix pattern of colored portions of R, G and B was formed with a pigment-dispersed ink having the following prescription under the regulation of the volume of the ejected ink by the use of an ink jet printer so that the area of the colored portions might be 1.41 times as much as that of light-transmittable portions. In this case, dot diameters of the R, G and B colored portions were 85 µm, 105 µm and 105 µm, respectively, and length and width of a black matrix opening were 150 µm and 75 µm, respectively. One colored portion was formed with 3 dots of the respective colors.

A difference between a maximum value and a minimum value of light transmittance in the light-transmittable portion colored with R was 6%. For the G (green) colored portions and the B (blue) colored portions, measurement was similarly made, and differences in the light transmittance were 4% and 7%, respectively.

On the contrary, for comparison, the ink was applied so that the area of the colored portions might be substantially equal to that of the light-transmittable portions by decreasing the amount of the ink to be applied. In this case, dot diameters of R, G and B were 79 µm, 81 µm and 81 µm, respectively.

Differences in the light transmittance in the light-transmittable portions colored with R, G and B were 28%, 25% and 33%, respectively.

Next, spin coating was carried out with a two-pack thermosetting resin material so as to have a film thickness of 1 µm, followed by a heat treatment at 230° C. for 30 minutes to set the resin material, thereby preparing a color filter for liquid crystals.

Prescription Example of the Ink used in Example 3

|  | Ink R | Ink G | Ink B |
| --- | --- | --- | --- |
| Ethylene glycol | 15% | 15% | 18% |
| Ethyl alcohol | 5% | 5% | 4% |
| R, G or B Pigment | 5% | 5% | 4% |
| Styrene-acrylic acid resin monoethanolamine salt (average molecular weight = 12,000, acid value = 400) | 1% | 0.8% | 0.5% |
| Water | 73% | 74.2% | 73.5% |
| R (red) pigment: | Mixture of C.I. Pigment Red 220 and Pigment Yellow 108 | | |
| G (green) pigment: | C.I. Pigment Green 7 | | |
| B (blue) pigment: | Mixture of C.I. Pigment Blue 22 and Pigment Violet 30. | | |

The color filters for liquid crystals prepared in Examples 1 to 3 were observed through an optical microscope, and as a result, any faults such as color unevenness and the deterioration of contrast were not seen in the light-transmittable portions colored with R, G and B.

By the use of the thus obtained color filters, a series of operations of ITO, the formation of orientation films, the sealing of a liquid crystal material are carried out to prepare such color liquid crystal panels as shown in FIG. 8. On the thus prepared color liquid crystal panels, various image patterns were formed, and the sharpness of the images was evaluated. As a result, they exhibited good results.

On the contrary, in a color filter for comparison, the color unevenness and the deterioration of contrast were noticeably observed in the colored light-transmittable portions.

When a method for manufacturing a liquid color filter of the present invention is employed, a color filter for liquid crystals which permits obtaining a reliable sharp image at a low cost can be manufactured.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structurers and functions.

What is claimed is:

1. A method for manufacturing a color filter comprising the steps of:

providing a substrate having a plurality of light-transmittable portions and a shade portion;

forming an ink-receiving layer on the substrate surface; and applying colored ink to the light-transmittable portions by an ink jet system to create colored portions, in which the volume of colored ink is sufficient to form colored portions which have areas from 1.2 to 1.5 times greater than the areas of their respective light-transmittable portions.

2. The method according to claim 1, wherein the areas of colored portions are from 1.4 times to 1.5 times greater than the areas of their respective light-transmittable portions.

3. The method according to claim 1, wherein the shade portion is a black matrix.

4. The method according to claim 1, wherein the ink comprises a red ink, a green ink or a blue ink.

5. The method according to claim 4, wherein the ink is a pigment ink or a dye ink.

6. The method according to claim 1, wherein a difference between a maximum value and a minimum value of light-transmittance in a thickness direction in said light-transmittable portions is 20% or less.

7. The method according to claim 6, wherein the difference between a maximum value and a minimum value of light-transmittance is 15% or less.

8. The method according to claim 6, wherein the difference between a maximum value and a minimum value of light-transmittance is 10% or less.

* * * * *

UNITED STATES PATENT AND TRADEMARK OFFICE
CERTIFICATE OF CORRECTION

PATENT NO. : 5,726,724

DATED : March 10, 1998

INVENTOR(S): KATSUHIRO SHIROTA ET AL.

It is certified that error appears in the above-identified patent and that said Letters Patent is hereby corrected as shown below:

[54] TITLE

"LIGHT" should read --LIGHT---.

[56] REFERENCES CITED

Other Documents
Insert --Patent Abstracts of Japan, Vol. 16, No. 382 (Aug. 1992) (P-1403).--.

COLUMN 1

Line 5, "LIGHT" should read --LIGHT---.

Line 13, "machines" should read --machine)--.

COLUMN 4

Line 5, "an y" should read --a y--; and
"a x" should read --an x--.

UNITED STATES PATENT AND TRADEMARK OFFICE
CERTIFICATE OF CORRECTION

PATENT NO. : 5,726,724

DATED : March 10, 1998

INVENTOR(S): KATSUHIRO SHIROTA ET AL.　　　　Page 2 of 2

It is certified that error appears in the above-identified patent and that said Letters Patent is hereby corrected as shown below:

<u>COLUMN 6</u>

Line 3, "an" should read --of--.

Line 42, "matirx," should read --matrix,--.

Signed and Sealed this

Seventeenth Day of November, 1998

Attest:

BRUCE LEHMAN

Attesting Officer　　　Commissioner of Patents and Trademarks